Nov. 14, 1967 T. A. STINNETT 3,353,113
DIGITAL FREQUENCY STANDARD
Filed June 22, 1965
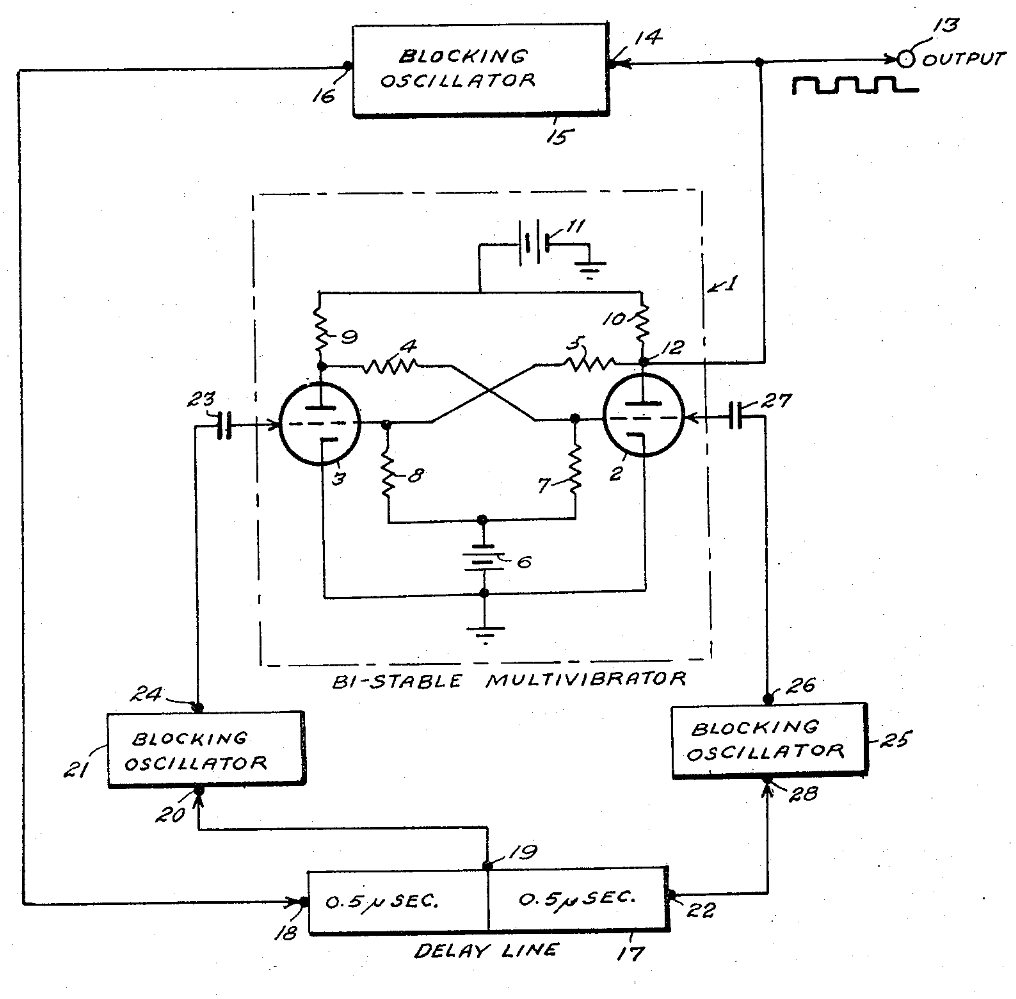
INVENTOR
Thomas A. Stinnett
BY: Harry M. Saragovitz,
Edward J. Kelly &
A. J. Dupont
ATTORNEYS.

United States Patent Office 3,353,113
Patented Nov. 14, 1967

3,353,113

DIGITAL FREQUENCY STANDARD

Thomas Alva Stinnett, Ripley, Md.
(Box 637 La Plata, Md. 20646)

Filed June 22, 1965, Ser. No. 466,137
3 Claims. (Cl. 331—55)

ABSTRACT OF THE DISCLOSURE

A digital frequency standard consisting of a bi-stable multivibrator triggered by a blocking oscillator at each of its two inputs in response to pulses generated by a third blocking oscillator which are coupled to the blocking oscillators connected to the two inputs through a tapped delay line. The third blocking oscillator is initially triggered by the bi-stable multivibrator.

The invention described herein may be manufactured and used by or for the Government for govenrmental purposes, without the payment to me of any royalty thereon.

The invention relates to radio frequency oscillators but more particularly to the type employed as a frequency standard.

An object of the invention is a frequency standard that is virtually without frequency drift and whose accuracy is dependent solely on the manufacturing tolerances of the time base element components.

Another object of the invention is a simple and inexpensive frequency standard whose error per cycle for a given frequency can be calculated and which will not change from day to day.

A still further object of the invention is a frequency standard wherein the component parts of the digital circuits thereof would not have to be temperture compensated as characteristic of such devices employing crystal oscillators.

Referring now to the sole figure in the drawing, 1 generally indicates a basic bi-stable multivibrator for the purpose of illustration. It being understood that a more sophisticated bi-stable multivibrator may be employed, including the utilization of solid state devices. Triode tube 2 has its grid coupled to the plate of triode 3 by means of coupling resistor 4. The grid and plate of triodes 2 and 3 being similarly coupled by coupling resistor 5. The grids of triodes 2 and 3 are also provided with a fixed bias source 6 through biasing resistors 7 and 8 respectively. The plates of triodes 2 and 4 are connected to the positive terminal of plate potential source 11 through plate load resistors 9 and 10 respectively and the cathodes thereof connected to the negative terminal, or common circuit, of potential source 11. Since the operation of the bi-stable multivibrator is well understood it shall be touched on but briefly here, that is, an increase in the plate current of triode 3, causes a negative pulse to appear at its plate which is applied to the grid of triode 2 through resistor 4. Therefore this grid goes negative as a result of the aforementioned pulse and the plate current of triode 2 decreases causing a positive pulse to appear at the plate terminal 12 of triode 2. This positive pulse is instantly applied to the grid of triode 3 through coupling resistor 5 causing an increase in plate current of triode 3 resulting in the grid of triode 2 becoming more negative. The plate terminal 12 is connected to output terminal 13 and to the input terminal 14 of blocking oscillator 15 whose output terminal 16 is connected to the input terminal 18, delay line 17. The delay line 17 as shown in the drawing is a one microsecond delay line composed of two 0.5 microsecond sections provided with a tap 19 at the end of the first section and an output terminal 22. Although the delay line 17 is designed for one megacycle oscillator operation it is to be understood that delay lines of other values may be used. The blocking oscillator 21 has its input 20 coupled to the 0.5 microsecond tap of delay line 17 and its output 22 coupled to the grid of triode 3 by means of capacitor 23. The blocking oscillator 25 has its output 26 coupled to the grid of triode 2 by means of capacitor 27 and its input 28 coupled to the output 22 of delay line 17.

In operation, assuming a negative going voltage at the plate of triode 3 which condition is attained through electrical transit or a manual reset, not shown, a pulse will be generated by the bi-stable multivibrator 1 which will trigger the blocking oscillator 15 into generating a triggering pulse which is applied to the input of delay line 17. This triggering pulse then travels down the delay line and is applied at 0.5 microsecond later through tip 19 to blocking oscillator 21 which then triggers multivibrator 1 at the grid of triode 3 resulting in a negative going voltage pulse at the plate of triode 2 and a positive going voltage pulse at the plate of triode 3. At the termination of another 0.5 microsecond, the triggering pulse will have completed its travel through the delay line and triggered blocking oscillator 25 which in response thereto triggers multivibrator 1 at the grid of triode 2 whereupon a negative going voltage pulse would exist at the plate of triode 3 and a positive going voltage pulse at the plate of triode 2 from which the output is taken. Thus, it can be seen that the invention functions as a precise digital frequency standard which is capable of high stability and drift free operation through the use of delay lines for frequency control means in combination with blocking oscillators to control the frequency of a bi-stable multivibrator or similar oscillator.

Although a specific embodiment of the invention has been shown and described, it will be understood that this is but illustrative and that various modifications may be made therein without departing from the spirit of the invention and the scope of the appended claims.

I claim:

1. A digital frequency stadard of high stability comprising in combination a bi-stable multivibrator having an output terminal and two input terminals, a first triggering means, an electrical delay line provided with a center tap, said first triggering means coupled to said output terminal and responsive to the output pulse of said bi-stable multivibrator, the output of said first triggering means coupled to one end of said electrical delay line, a second triggering means coupled between said center tap and one of said input terminals, and a third triggering means coupled between the opposite end of said electrical delay line and the other of said input terminals.

2. The invention in accordance with claim 1 wherein said first, second and third triggering means are blocking oscillators.

3. A digital frequency standard of high stability comprising in combination a bi-stable multivibrator including a first and second interconnected triode tubes, an electrical delay line provided with a center tap, a first blocking oscillator having its input connected to the plate of said first triode for triggering by said multivibrator and its output connected to one end of said electrical delay line whereby the pulse generated by said first blocking oscillator is applied to the said one end, a second blocking oscillator having its input coupled to said center tap for triggering by said pulse, a third blocking oscillator having its input coupled to the other end of said electrical delay for triggering by said pulse when said pulse has traversed said electrical delay line, the output of said second blocking oscillator coupled to the grid of said second triode and the output of said third oscillator coupled to the grid of said first triode whereby control pulses generated by said second and third monostable blocking oscillators are applied to the grid of said second triode and the grid of said first triode, respectively, for controlling the frequency of said bi-stable multivibrator as determined by the time delay factors of said electrical delay line.

References Cited

UNITED STATES PATENTS

| | | | |
|---|---|---|---|
| 2,436,808 | 3/1948 | Jacobsen et al. | 331—144 |
| 3,125,730 | 3/1964 | Levy et al. | 331—55 |

ROY LAKE, *Primary Examiner.*

J. B. MULLINS, *Assistant Examiner.*